US012597374B2

(12) United States Patent
Kim et al.

(10) Patent No.: US 12,597,374 B2
(45) Date of Patent: Apr. 7, 2026

(54) FOLDABLE DISPLAY DEVICE AND METHOD FOR COMPENSATING FOR DETERIORATION OF FLEXIBLE DISPLAY PANEL

(71) Applicant: Samsung Display Co., Ltd., Yongin-Si (KR)

(72) Inventors: Hyungjin Kim, Yongin-si (KR); Moon-Chul Park, Yongin-si (KR); Yoonsik Park, Yongin-si (KR); Kanghee Lee, Yongin-si (KR); Kyungsu Lee, Yongin-si (KR); Seokha Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/829,283

(22) Filed: Sep. 10, 2024

(65) Prior Publication Data

US 2025/0104585 A1     Mar. 27, 2025

(30) Foreign Application Priority Data

Sep. 26, 2023     (KR) ......................... 10-2023-0129754

(51) Int. Cl.
*G09G 3/00*          (2006.01)
*G06F 1/16*          (2006.01)
                     (Continued)
(52) U.S. Cl.
CPC ........... *G09G 3/006* (2013.01); *G06F 1/1641* (2013.01); *G06F 1/1652* (2013.01);
                     (Continued)

(58) Field of Classification Search
CPC ..... G09G 2320/043; G09G 2320/0285; G09G 2320/045; G09G 3/3208;
                     (Continued)

(56) References Cited

U.S. PATENT DOCUMENTS 7,675,492 B2     3/2010  Park et al.
11,775,026 B1 *  10/2023 Park ..................... G06F 1/3278
                                                      345/156
                     (Continued)

FOREIGN PATENT DOCUMENTS

KR     10-2021-0094956 A     7/2021
KR     10-2022-0147962 A     11/2022

*Primary Examiner* — Dismery Mercedes
(74) *Attorney, Agent, or Firm* — Innovation Counsel LLP

(57)               ABSTRACT

A foldable display device is disclosed that includes a flexible display panel, an optical module, and a deterioration compensator. The flexible display panel includes a folding line, a first display area disposed on a first side of the folding line, and a second display area disposed on a second side of the folding line to display a test image. The optical module is disposed in the first display area and is configured to sense a display luminance of the test image. The deterioration compensator is configured to perform a deterioration compensating operation of the display luminance by a luminance compensation value when the display luminance is less than a target luminance, without performing the deterioration compensating operation when the display luminance is greater than the target luminance.

17 Claims, 13 Drawing Sheets

SENSING A DISPLAY LUMINANCE WHICH IS A LUMINANCE OF A TEST IMAGE DISPLAYED ON A FLEXIBLE DISPLAY PANEL INCLUDING A FIRST DISPLAY AREA AND A SECOND DISPLAY AREA — S100

PERFORMING A DETERIORATION COMPENSATING OPERATION OF COMPENSATING FOR THE DISPLAY LUMINANCE BY A LUMINANCE COMPENSATION VALUE WHEN THE DISPLAY LUMINANCE IS SMALLER THAN OR EQUAL TO A TARGET LUMINANCE WITHOUT PERFORMING THE DETERIORATION COMPENSATING OPERATION WHEN THE DISPLAY LUMINANCE IS GREATER THAN THE TARGET — S200

(51) Int. Cl.
  *G09G 3/20*          (2006.01)
  *G09G 3/3225*        (2016.01)

(52) U.S. Cl.
  CPC ......... *G09G 3/2003* (2013.01); *G09G 3/3225*
        (2013.01); *G09G 2320/0233* (2013.01); *G09G*
          *2320/0257* (2013.01); *G09G 2320/0285*
        (2013.01); *G09G 2320/043* (2013.01); *G09G*
          *2320/048* (2013.01); *G09G 2320/0626*
          (2013.01); *G09G 2380/02* (2013.01)

(58) Field of Classification Search
  CPC ....... G09G 2320/0233; G09G 2360/16; G09G
        2320/048; G09G 3/3291; G09G 3/006;
          G09G 2380/02; G09G 3/035; G06F
        1/1652; G06F 1/1641; G06F 2203/04102;
                      G06F 1/1616
  See application file for complete search history.

(56)                References Cited

U.S. PATENT DOCUMENTS

| | | | | |
|---|---|---|---|---|
| 2008/0088648 | A1* | 4/2008 | Nathan | .................. H05B 45/60 |
| | | | | 345/76 |
| 2016/0307498 | A1* | 10/2016 | Chaji | ................... G09G 3/3291 |
| 2017/0213493 | A1* | 7/2017 | Han | ..................... G09G 3/3208 |
| 2018/0020525 | A1* | 1/2018 | Moon | ....................... H01J 1/62 |
| 2019/0189045 | A1* | 6/2019 | Hwang | ............... G09G 3/2003 |
| 2020/0058251 | A1* | 2/2020 | Lee | ..................... G09G 3/3225 |
| 2020/0111455 | A1* | 4/2020 | Lee | ........................ G09G 5/373 |
| 2020/0265799 | A1* | 8/2020 | Choi | ................... G06F 1/1652 |
| 2021/0201820 | A1* | 7/2021 | Song | ................... G09G 3/3266 |
| 2023/0030225 | A1* | 2/2023 | Lee | ..................... G09G 3/3258 |
| 2023/0205275 | A1* | 6/2023 | Jung | ................... G06F 1/1686 |

* cited by examiner

FIG. 11

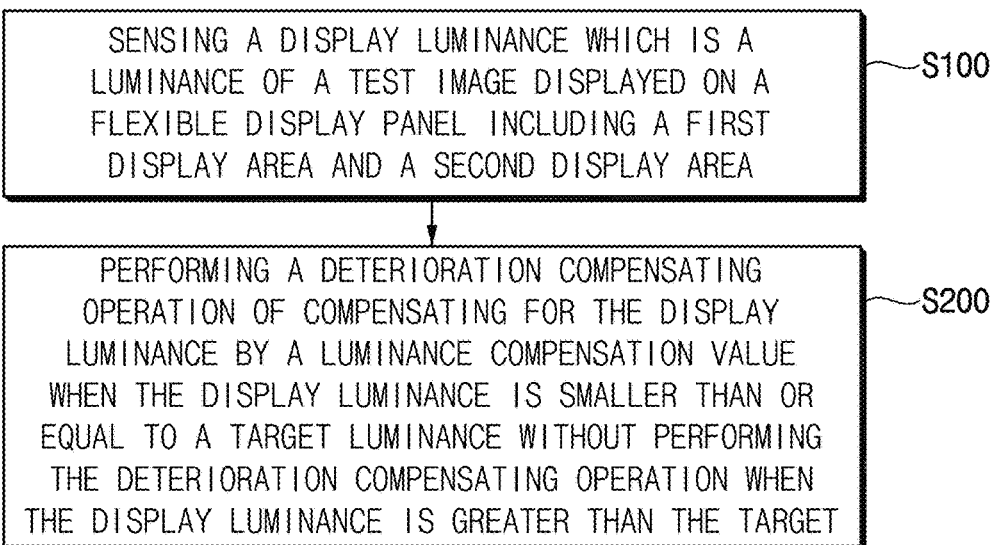

| | |
|---|---|
| SENSING A DISPLAY LUMINANCE WHICH IS A LUMINANCE OF A TEST IMAGE DISPLAYED ON A FLEXIBLE DISPLAY PANEL INCLUDING A FIRST DISPLAY AREA AND A SECOND DISPLAY AREA | S100 |
| PERFORMING A DETERIORATION COMPENSATING OPERATION OF COMPENSATING FOR THE DISPLAY LUMINANCE BY A LUMINANCE COMPENSATION VALUE WHEN THE DISPLAY LUMINANCE IS SMALLER THAN OR EQUAL TO A TARGET LUMINANCE WITHOUT PERFORMING THE DETERIORATION COMPENSATING OPERATION WHEN THE DISPLAY LUMINANCE IS GREATER THAN THE TARGET | S200 |

FIG. 12

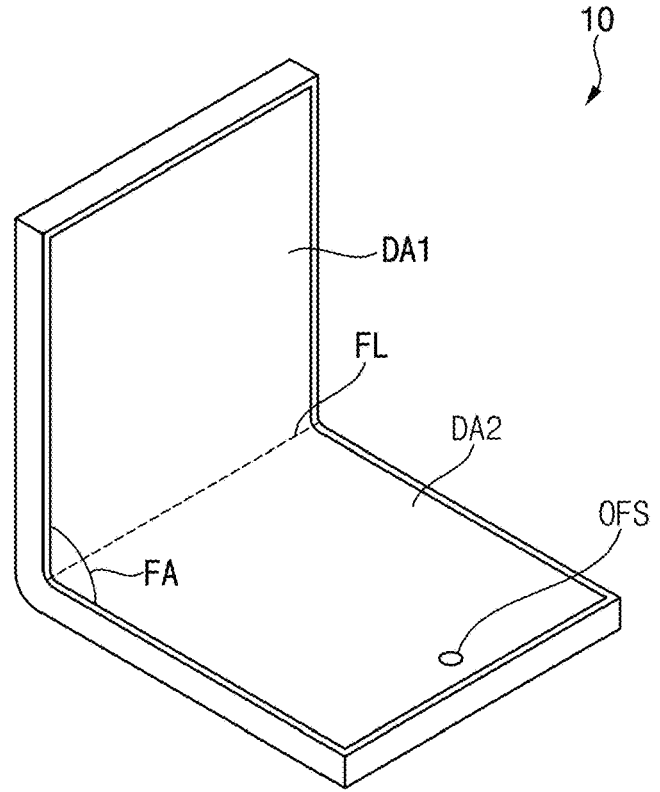

FOLDABLE DISPLAY DEVICE AND METHOD FOR COMPENSATING FOR DETERIORATION OF FLEXIBLE DISPLAY PANEL

This application claims priority under 35 USC § 119 to Korean Patent Application No. 10-2023-0129754 filed on Sep. 26, 2023 in the Korean Intellectual Property Office (KIPO), the entire disclosure of which is incorporated by reference herein.

BACKGROUND

1. Field

Embodiments of the present inventive concept relate to a fordable display device and a method of compensating for a deterioration of a flexible display panel

2. Description of the Related Art

Generally, a display device may include a display panel and a display panel driver. The display panel may include gate lines, data lines and pixels. The display panel driver may include a gate driver for providing a gate signal to the gate lines, a data driver for providing a data voltage to the data lines and a driving controller for controlling the gate driver and the data driver.

A display luminance of each of the pixels may be determined based on intensity of a driving current of each of the pixels, the intensity of the driving current may be determined by a level of the data voltage, and the level of the data voltage may be determined based on a grayscale of input image data received by the driving controller.

SUMMARY

Embodiments of the present inventive concept may provide a foldable display device which compensates for a deterioration of a flexible display panel to improve a display quality.

Embodiments of the present inventive concept may provide a method of compensating for the deterioration of the flexible display panel using the foldable display device.

An embodiment of a foldable display device comprises a flexible display panel including a folding line, a first display area disposed on a first side of the folding line, and a second display area disposed on a second side of the folding line to display a test image, an optical module disposed in the first display area configured to sense a display luminance of the test image, and a deterioration compensator configured to perform a deterioration compensating operation of the display luminance by a luminance compensation value when the display luminance is less than a target luminance, without performing the deterioration compensating operation when the display luminance is greater than the target luminance.

In an embodiment, the optical may module perform the sensing operation when a folding angle between the first display area and the second display area is less than or equal to a reference angle.

In an embodiment, the reference angle may include 0 degrees.

In an embodiment, a sensing area of the test image sensed by the optical module may be determined by the folding angle.

In an embodiment, the sensing area may be less than an area of the flexible display panel.

In an embodiment, the sensing area may be equal to an area of the optical module when the folding angle is 0 degrees.

In an embodiment, the deterioration compensating operation may be performed on a whole of the flexible display panel based on the sensing area.

In an embodiment, the luminance compensation value is applied to the whole of the flexible display panel.

In an embodiment, the test image may be displayed in the second display area when the sensing operation is performed.

In an embodiment, the deterioration compensator may include a lookup table including a luminance compensation value corresponding to a stress value of the flexible display panel.

In an embodiment, the deterioration compensator may use the lookup table to compensate for the display luminance by the luminance compensation value corresponding to a stress value of the flexible display panel, and the stress value may be a degree of deterioration of a pixel that depends on one or more operating conditions of the pixel over time.

In an embodiment, the deterioration compensator may include a memory device configured to store a stress value of the flexible display panel, a compensation value calculator configured to calculate the luminance compensation value based on the stress value, and a compensation determiner configured to determine whether to perform a deterioration compensating operation by comparing the display luminance with the target luminance, and compensate for the display luminance by the luminance compensation value when the deterioration compensating operation is performed.

In an embodiment, the optical module may include a camera module or an optical fingerprint sensor.

An embodiment of a method of compensating for deterioration of a flexible display panel includes sensing a display luminance of a test image displayed on a flexible display panel that includes a folding line, a first display area disposed on a first side of the folding line, and a second display area disposed on a second side of the folding line to display the test image. The embodiment of the method further includes performing a deterioration compensating operation of compensating for the display luminance by a luminance compensation value when the display luminance is less than a target luminance and not performing the deterioration compensating operation when the display luminance is greater than the target luminance.

According to the display device and the method of driving the display device, the display device and the method may sense the display luminance, which is the luminance of the test image, using the optical module disposed in the first display area of the flexible display panel, and does not perform a deterioration compensation operation in the mis-compensation period where the display luminance is greater than the target luminance. In addition, the deterioration compensation operation is performed in a compensation section in which the display luminance is less than or equal to the target luminance. Accordingly, the foldable display device may selectively perform the deterioration compensation operation in the compensation period to improve a display quality of the foldable display device.

BRIEF DESCRIPTION OF THE DRAWINGS

The above and other features of embodiments of the present inventive concept will become more apparent by describing in detailed embodiments thereof with reference to the accompanying drawings, in which:

FIG. 11 is a flowchart illustrating a method of compensating for deterioration of the flexible display panel according to one embodiment of the present disclosure;

FIG. 12 is a perspective view illustrating a foldable display device according to embodiments;

DETAILED DESCRIPTION OF THE EMBODIMENTS

Hereinafter, the present disclosure will be described in more detail with reference to the accompanying drawings.

Figure 1:
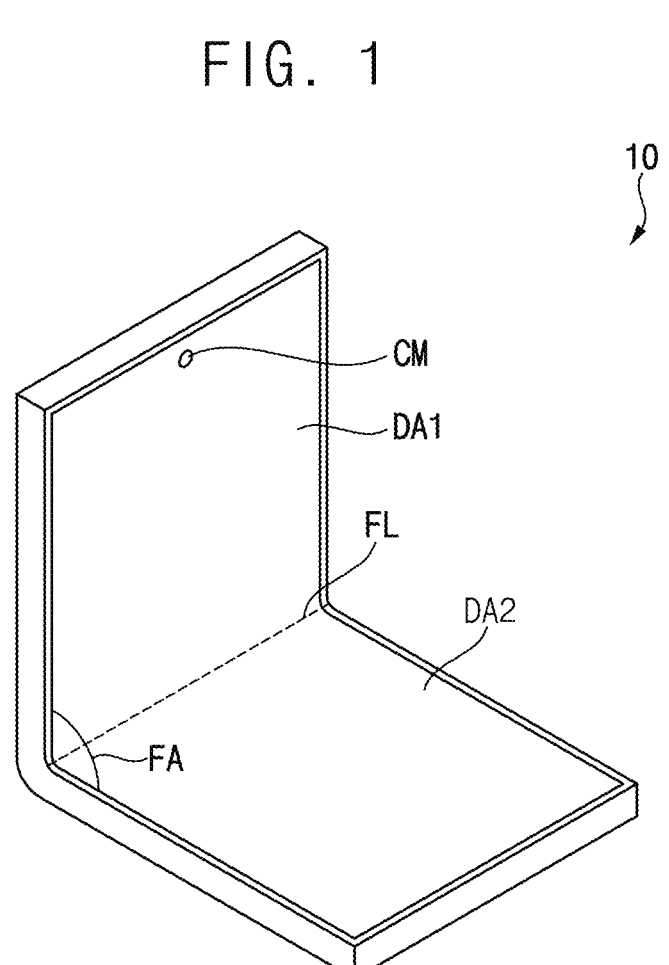
FIG. 1 is a perspective view illustrating a foldable display device according to one embodiment of the present disclosure.
Figure 2:
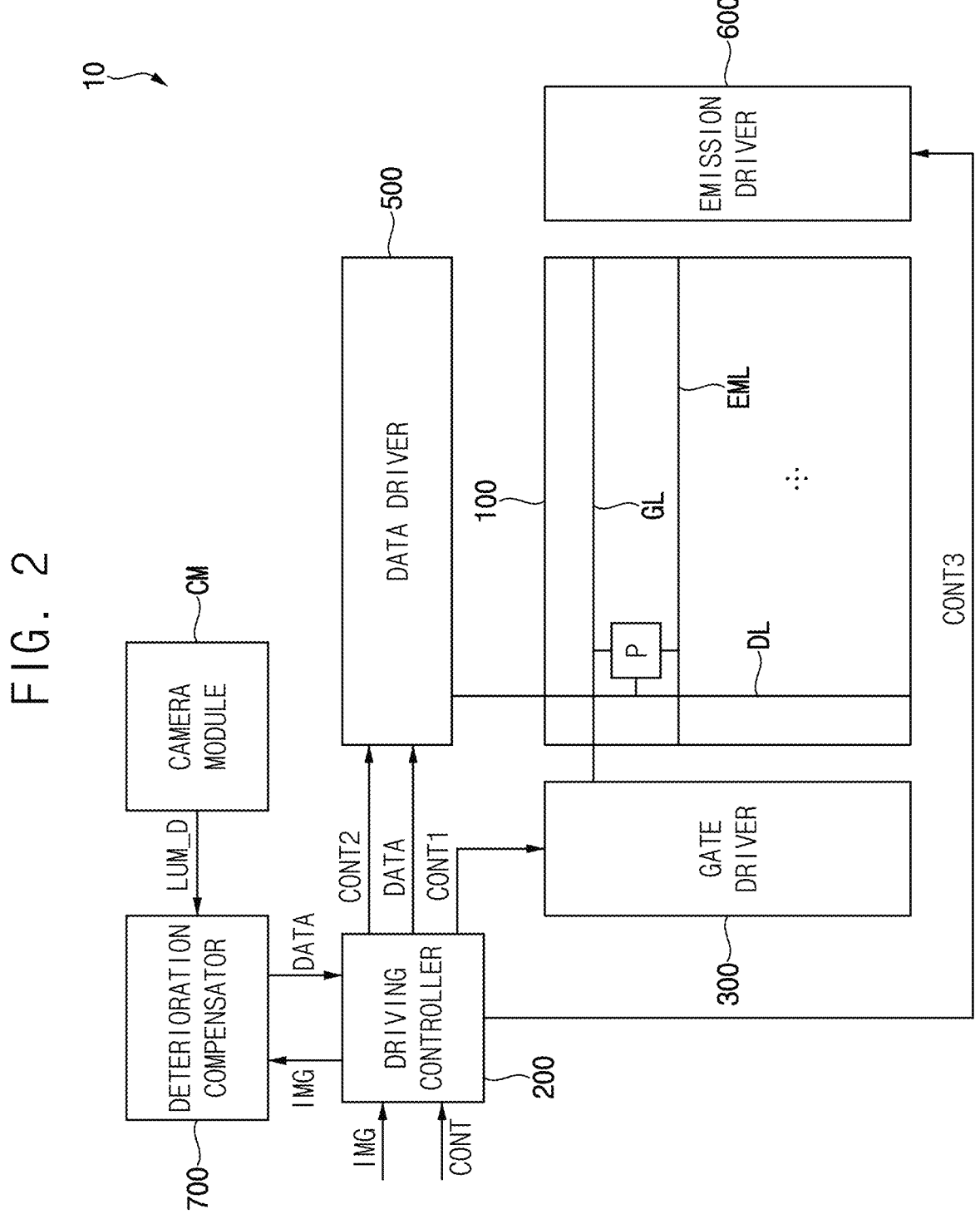
FIG. 2 is a block diagram illustrating the foldable display device of FIG. 1.

FIG. 1 is a perspective view illustrating a foldable display device 10 according to an embodiment of the present disclosure. FIG. 2 is a block diagram illustrating the foldable display device 10 of FIG. 1.

Referring to FIGS. 1 and 2, the display device 10 according to one embodiment of the present disclosure may be a foldable display device. The foldable display device may be a display device to which a flexible display technology is applied. The flexible display technology may refer to a technology in which a flexible display panel bendable without damage is applied.

The foldable display device 10 includes a flexible display panel 100 and a display panel driver. The display panel driver may include a driving controller 200, a gate driver 300, a data driver 500, an emission driver 600, and a deterioration compensator 700. The foldable display device 10 may further include an optical module. In one embodiment, the optical module may be a camera module CM.

In an embodiment, the driving controller 200 and the data driver 500 may be integrally formed. In an embodiment, the driving controller 200, the data driver 500, and the emission driver 600 may be integrally formed. A driving module in which at least the driving controller 200 and the data driver 500 are integrally formed may be referred to as a timing controller embedded data driver (TED).

The flexible display panel 100 may include a display portion for displaying an image and a peripheral portion disposed adjacent to the display portion.

The flexible display panel 100 may include a folding line FL, a first display area DA1 disposed on a first side of the folding line FL, and a second display area DA2 disposed on a second side of the folding line FL. The flexible display panel 100 may be folded about the folding line FL. When the flexible display panel 100 is folded, a folding angle FA, which is an angle between the first display area DA1 and the second display area DA2, may be decreased. In one embodiment, the folding angle FA may range from 0 degrees to 180 degrees. In another embodiment, the folding angle FA may range from 0 degrees to 360 degrees.

In an embodiment, the flexible display panel 100 may be an organic light emitting diode display panel including an organic light emitting diode. For example, the flexible display panel 100 may be a quantum-dot organic light emitting diode display panel including an organic light emitting diode and a quantum-dot color filter. For example, the flexible display panel 100 may be a quantum-dot nano light emitting diode display panel including a nano light emitting diode and a quantum-dot color filter.

The flexible display panel 100 may include gate lines GL, data lines DL, emission lines EML, and pixels P each electrically connected to the gate lines GL, the data lines DL and the emission lines EML. The gate lines GL may extend in a first direction, the data lines DL may extend in a second direction crossing the first direction, and the emission lines EML may extend in the first direction.

The driving controller 200 may receive input image data IMG and an input control signal CONT from an external apparatus (not shown). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The gate driver 300 may generate gate signals for driving the gate lines GL in response to the first control signal CONT1 received from the driving controller 200. The gate driver 300 may output the gate signals to gate lines GL.

The data driver 500 may receive the second control signal CONT2 and the data signal DATA from the driving controller 200. The data driver 500 may convert the data signal DATA into analog data voltages. The data driver 500 may output the data voltages to the data lines DL.

The emission driver 600 generates emission signals for driving the emission lines EML in response to the third control signal CONT3 received from the driving controller 200. The emission driver 600 may output the emission signals to emission lines EML.

The camera module CM may be disposed in the first display area DA1. The camera module CM may photograph an object positioned in front of the flexible display device 10 or sense external luminance. In other words, the camera module CM may include an illuminance sensor and sense the external luminance through the illuminance sensor. In the present embodiment, the flexible display panel 100 may display a test image in the second display area DA2, and the camera module CM may sense a display luminance LUM_D that is a luminance of the test image. The camera module CM may be referred to as an optical module.

The deterioration compensator 700 may receive the display luminance LUM_D from the camera module CM, and receive the input image data IMG from the driving controller 200. The pixels P included in the flexible display panel 100 may be deteriorated according to use. The deterioration compensator 700 may generate a stress value for each of the pixels P based on the input image data IMG. The stress value may refer to a degree of deterioration of the pixels P. The deterioration compensator 700 may generate the data signal DATA by compensating the input image data IMG based on the input image data IMG, the display luminance LUM_D, and the stress value. The deterioration compensator 700 may output the data signal DATA to the data driver 500. The deterioration compensator may be implemented as one or more integrated circuits.

In the present embodiment, the deterioration compensator 700 is exemplified as being formed separately from the driving controller 200, but the present disclosure is not limited thereto. In another embodiment, the deterioration compensator 700 may be integrally formed with the driving controller 200.

Figure 3:
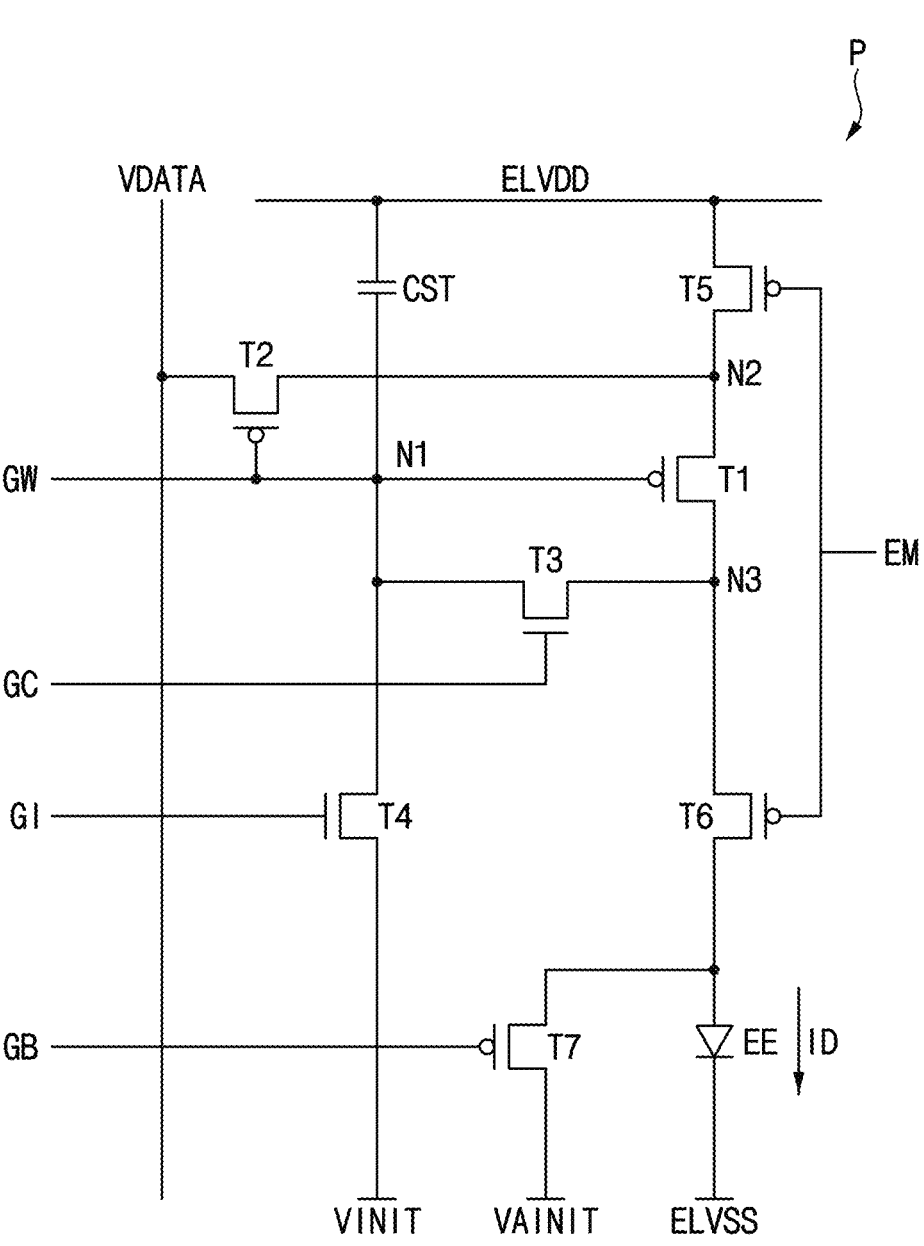
FIG. 3 is a circuit diagram illustrating an example of the pixel included in the foldable display device of FIG. 2.

FIG. 3 is a circuit diagram illustrating an example of the pixel P included in the foldable display device 10 of FIG. 2.

Referring to FIGS. 1 to 3, the pixel P may include first to seventh transistors T1 to T7 and a light emitting element EE.

The first transistor T1, which may be referred to as a driving transistor, may include a gate electrode connected to a first node N1, a first electrode connected to a second node N2, and a second electrode connected to a third node N3.

The second transistor T2 may include a gate electrode to which a data write gate signal GW is applied, a first electrode to which the data voltage VDATA is applied, and a second electrode connected to the second node N2. The data voltage VDATA may be applied to the pixel P according to the data write gate signal GW.

The third transistor T3 may include a gate electrode to which a compensation gate signal GC is applied, a first electrode connected to the first node N1, and a second electrode connected to the third node N3. A threshold voltage of the first transistor T1 may be compensated according to the compensation gate signal GC.

The fourth transistor T4 may include a gate electrode to which a data initialization gate signal GI is applied, a first electrode to which an initialization voltage VINIT is applied, and a second electrode connected to the first node N1. According to the data initialization gate signal GI, the gate electrode of the first transistor T1 may be initialized to the initialization voltage VINIT.

The fifth transistor T5 may include a gate electrode to which the emission signal EM is applied, a first electrode to which a first driving voltage ELVDD is applied, and a second electrode connected to the second node N2.

The sixth transistor T6 may include a gate electrode to which the emission signal EM is applied, a first electrode connected to the third node N3, and a second electrode connected to an anode electrode of the light emitting element EE.

The seventh transistor T7 may include a gate electrode to which a light emitting element initialization gate signal GB is applied, a first electrode to which a light emitting element initialization voltage VAINIT is applied and a second electrode connected to the anode electrode of the light emitting element EE. The anode electrode of the light emitting element EE may be initialized to the light emitting element initialization voltage VAINIT according to the light emitting element initialization gate signal GB.

The light emitting element EE may include the anode electrode and a cathode electrode to which a second driving voltage ELVSS is applied. The second driving voltage ELVSS may be lower than the first driving voltage ELVDD.

The pixel P may further include a storage capacitor CST including a first electrode to which the first driving voltage ELVDD is applied and a second electrode connected to the first node N1. The storage capacitor CST may store a voltage corresponding to the data voltage VDATA.

A driving current ID of the pixel P may sequentially flow to the fifth transistor T5, the first transistor T1 and the sixth transistor T6 to drive the light emitting element EE. A luminance of the light emitting element EE may be determined by intensity of the driving current ID. The intensity of the driving current ID may be determined by a level of the data voltage VDATA. The level of the data voltage VDATA may be determined by a grayscale of the input image data IMG.

When all of the transistors included in the pixel P are P-type transistors, flicker may occur due to leakage currents of the transistors in low-frequency driving. Accordingly, some of the transistors included in the pixel P may be N-type transistors. In the present embodiment, the third transistor T3 and the fourth transistor T4 may be the N-type transistors, and the first transistor T1, the second transistor T2, the fifth transistor T5, the sixth transistor T6 and the seventh transistor T7 may be the P-type transistors. However, the present disclosure is not limited thereto. The present disclosure may be applied to a pixel including only the P-type transistor or may be applied to a pixel including only the N-type transistor.

FIGS. 4A to 4D are graphs illustrating display luminance LUM_D according to a stress value SV of a pixel P.

Referring to FIGS. 1 to 4D, the pixel P may be deteriorated according to use. As the pixel P is used, the stress value SV may be increased. The stress value SV may refer to a deterioration degree of the pixel P over time. The degree of deterioration may depend on one or more operating conditions (e.g., the grayscale of the input image data IMG, the data voltage VDATA, or the driving current ID) over time. When the use time of the pixel P is increased, the pixel P may be further deteriorated. For example, when the grayscale of the input image data IMG, the data voltage VDATA, or the driving current ID are increased over time, the pixel P may be further deteriorated.

The display luminance LUM_D may be increased or decreased according to the stress value SV. A period in which the display luminance LUM_D is increased according to the stress value SV may be referred to as a rising period RP, and a period in which the display luminance LUM_D is decreased according to the stress value SV may be referred to as a falling period FP. In general, it may be difficult to predict a slope of a deterioration curve in the rising period RP, and it may be easy to predict the slope of the deterioration curve because the slope of the deterioration curve is constant in the falling period FP. In addition, the distribution of the stress value SV may be large in the rising period RP, and the distribution of the stress value SV may be small in the falling period FP. A deterioration amount ΔLUM_D may be calculated based on the stress value SV and the display luminance LUM_D. The deterioration amount ΔLUM_D may be a decrease degree of the display luminance LUM_D compared to a target luminance TL. For example, when the display luminance LUM_D is greater than the target luminance TL, the deterioration amount ΔLUM_D may have a negative value. For example, when the display luminance LUM_D is equal to the target luminance TL, the deterioration amount ΔLUM_D may be 0. For example, when the display luminance LUM_D is less than the target luminance TL, the deterioration amount ΔLUM_D may have a positive value. In one embodiment, the target luminance TL may be the display luminance LUM_D at the zero stress value SV0 of the flexible display device 10. FIGS. 4A to 4D illustrates deterioration curves G1, G2 and G3 representing the display luminance LUM_D according to the stress value SV.

Even when the foldable display device is manufactured under the same conditions (such as temperature, humidity, material, and process time), the characteristics of the flexible display panel may be different for each flexible display panel. Therefore, when the foldable display device is manufactured, the display luminance according to the same grayscale may be set to become the target luminance in consideration of the characteristics of the flexible display panel. When the foldable display device 10 is manufactured, the stress value SV may be a zero stress value SV0. This process may be performed by an inspection apparatus (not shown) that is separately present from the foldable display device 10. The inspection apparatus may sense the display luminance LUM_D under a strict condition in the manufacturing process, and may set the display luminance LUM_D to be the target luminance TL. However, the deterioration amount ΔLUM_D depending on the use of the flexible display panel 100 may vary according to the characteristics of the flexible display panel.

Figure 4A:
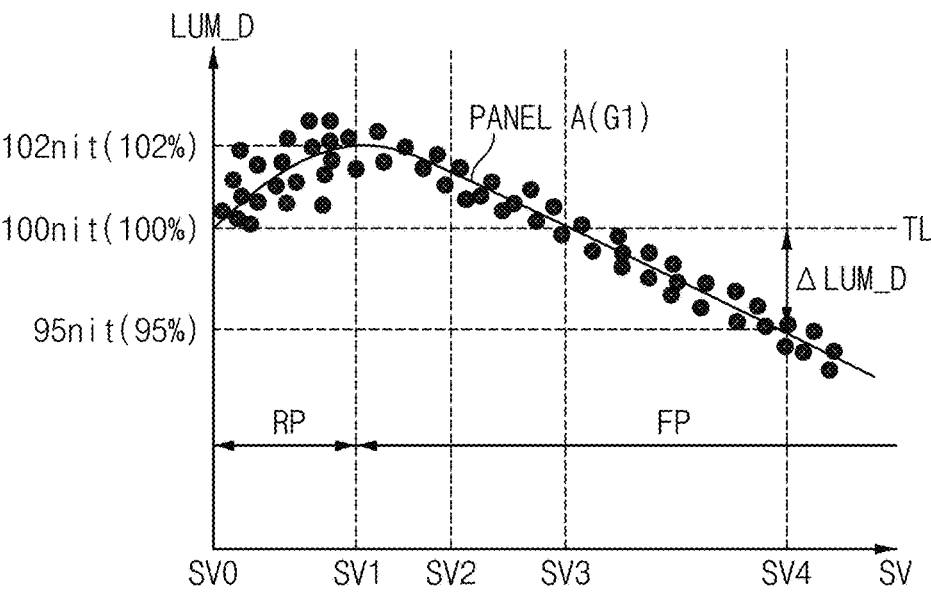
FIGS. 4A, 4B, 4C, and 4D are graphs illustrating display luminance according to a stress value of a pixel.
Figure 4B:
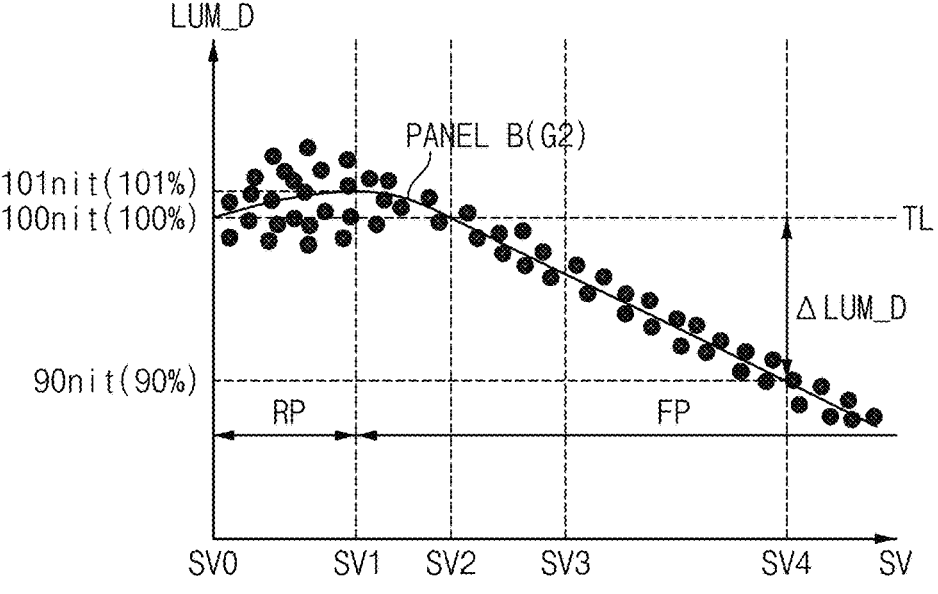
Figure 4C:
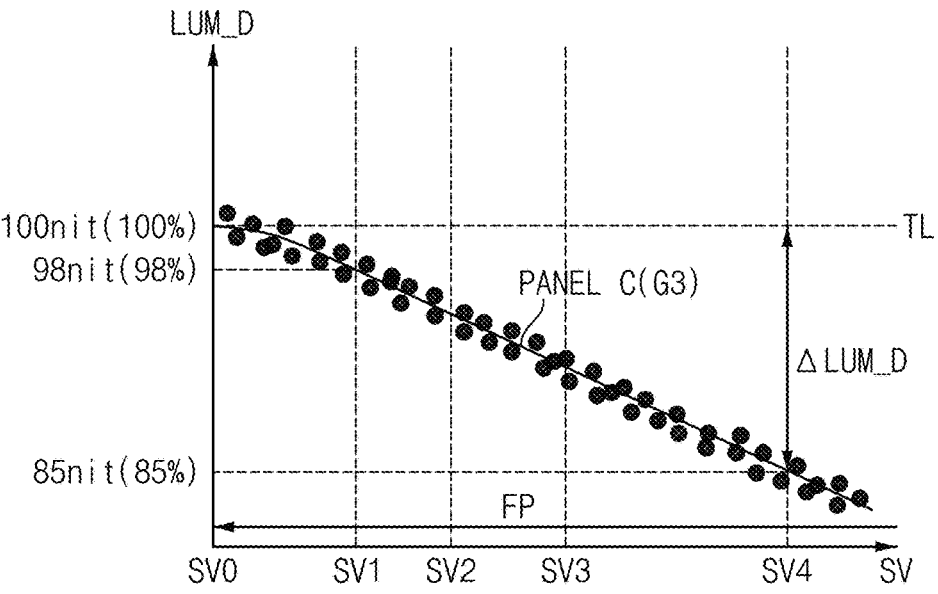
Figure 4D:
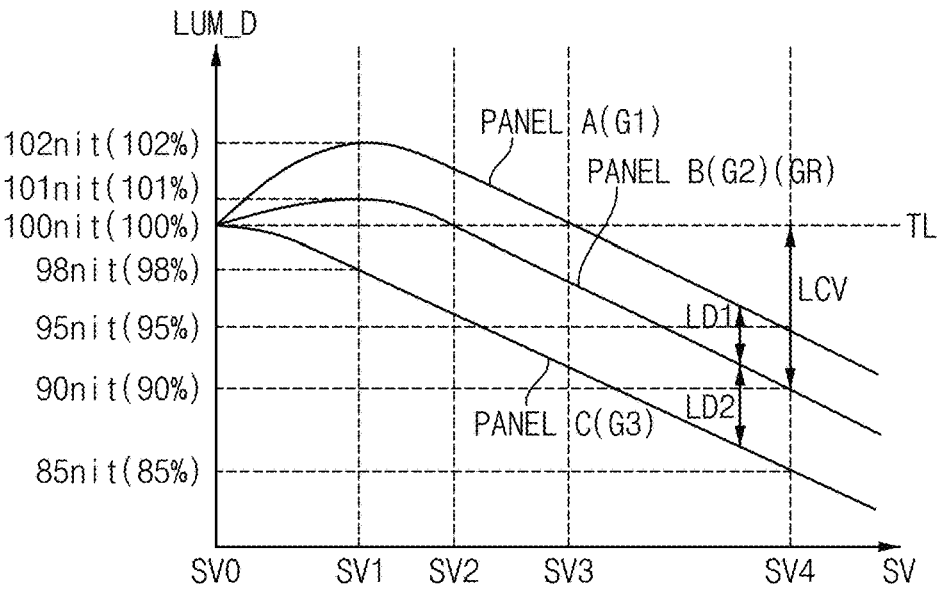

For example, a flexible display panel A, a flexible display panel B, and a flexible display panel C may be manufactured under the same conditions. As shown in FIG. 4A, the display luminance LUM_D according to the stress value SV may be dispersed in the flexible display panel A, and a deterioration curve G1 of the flexible display panel A may be expressed based on the dispersed display luminance LUM_D of the flexible display panel A. As shown in FIG. 4B, the display luminance LUM_D according to the stress value SV may be dispersed in the flexible display panel B, and a deterioration curve G2 of the flexible display panel B may be expressed based on the dispersed display luminance LUM_D of the flexible display panel B. As shown in FIG. 4C, the display luminance LUM_D according to the stress value SV may be dispersed in the flexible display panel C, and a deterioration curve G3 of the flexible display panel C may be expressed based on the dispersed display luminance LUM_D of the flexible display panel C. In FIG. 4D, the deterioration curve G1 of the flexible display panel A, the deterioration curve G2 of the flexible display panel B, and the deterioration curve G3 of the flexible display panel C are illustrated together. In the falling period FP, a difference LD1 between the deterioration curve G1 of the flexible display panel A and the deterioration curve G2 of the flexible display panel B may be constant. In the falling period FP, a difference LD2 between the deterioration curve G2 of the flexible display panel B and the deterioration curve G3 of the flexible display panel C may be constant.

For example, as shown in FIG. 4A, the display luminance LUM_D of the flexible display panel A may be 100 nit (100%) at the zero stress value SV0, may be 102 nit (102%) at a first stress value SV1, may be 100 nit (100%) at a third stress value SV3, and may be 95 nit (95%) at a fourth stress value SV4. In this case, the deterioration amount ΔLUM_D of the flexible display panel A may be 0 nit (0%) at the zero stress value SV0, may be −2 nit (−2%) at the first stress value SV1, 0 nit (0%) at the third stress value SV3, and may be 5 nit (5%) at the fourth stress value SV4. In the case of the flexible display panel A, the rising period RP may be a period between the zero stress value SV0 and the first stress value SV1, and the falling period FP may be a period after the first stress value SV1.

For example, as shown in FIG. 4B, the display luminance LUM_D of the flexible display panel B may be 100 nit (100%) at the zero stress value SV0, may be 101 nit (101%) at the first stress value SV1, may be 100 nit (100%) at the second stress value SV2, and may be 90 nit (90%) at the fourth stress value SV4. In this case, the deterioration amount ΔLUM_D of the flexible display panel B may be 0 nit (0%) at the zero stress value SV0, may be −1 nit (−1%) at the first stress value SV1, may be 0 nit (0%) at the second stress value SV2, and may be 10 nit (10%) at the fourth stress value SV4. The rising period RP may be the period between the zero stress value SV0 and the first stress value SV1, and the falling period FP may be the period after the first stress value SV1.

For example, as shown in FIG. 4C, the display luminance LUM_D of the flexible display panel C may be 100 nit (100%) at the zero stress value SV0, may be 98 nit (98%) at the first stress value SV1, and may be 85 nit (85%) at the fourth stress value SV4. In this case, the deterioration amount ΔLUM_D of the flexible display panel C may be 0 nit (0%) at the zero stress value SV0, may be −2 nit (−2%) at the first stress value SV1, and may be 15 nit (15%) at the fourth stress value SV4. The falling period FP may be a period after the zero stress value SV0, and the rising period RP may not exist.

Unlike the above manufacturing process, it is difficult to request a user to measure the display luminance LUM_D using the inspection apparatus after the flexible display device is manufactured. Thus, a reference deterioration curve GR may be generated by averaging the display luminance LUM_D according to the stress value SV of each of the flexible display panels manufactured under the same conditions. A luminance compensation value LCV according to the stress value SV may be calculated based on the reference deterioration curve GR, and the luminance compensation value LCV according to the stress value SV may be stored in a lookup table. The deterioration compensator 700 may include the lookup table and generate the luminance compensation value LCV according to the stress value SV based on the lookup table to compensate for the display luminance LUM_D by the luminance compensation value LCV.

For example, the reference deterioration curve GR may be generated based on the deterioration curve G1 of the flexible display panel A, the deterioration curve G2 of the flexible display panel B, and the deterioration curve G3 of the flexible display panel C. It is assumed that the reference deterioration curve GR is the same as the deterioration curve G2 of the flexible display panel B.

For example, the deterioration amount ΔLUM_D of the flexible display panel A at the fourth stress value SV4 may be 5 nit (5%), the deterioration amount ΔLUM_D of the flexible display panel B at the fourth stress value SV4 may be 10 nit (10%), and the deterioration amount ΔLUM_D of the flexible display panel C at the fourth stress value SV4 may be 15 nit (15%). When it is assumed that the reference deterioration curve GR is the same as the deterioration curve G2 of the flexible display panel B, the lookup table may be generated based on the reference deterioration curve GR. The luminance compensation value LCV according to the stress value SV calculated based on the lookup table may be 10 nit in all of the flexible display panel A, the flexible display panel B, and the flexible display panel C.

Figure 5:
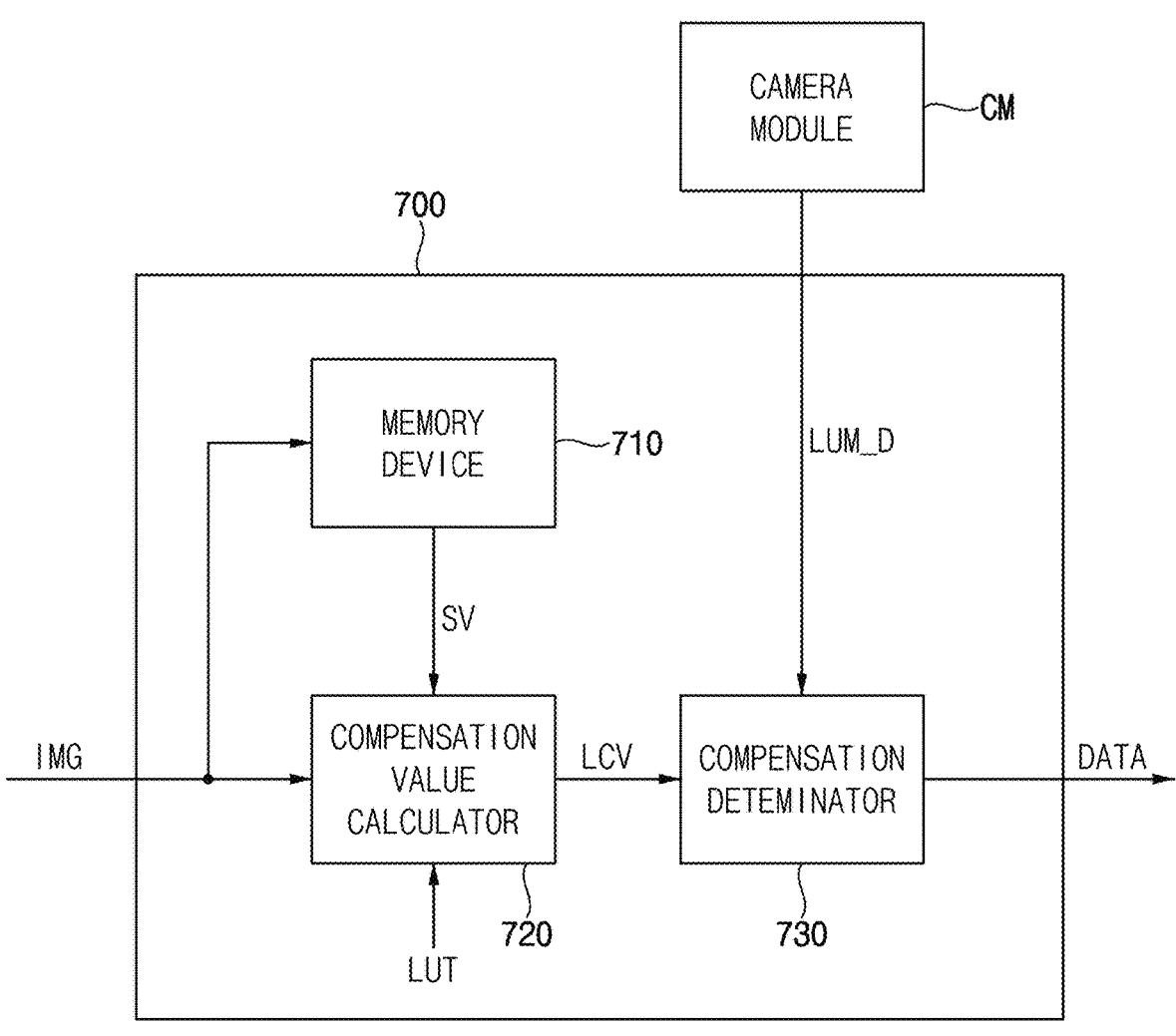
FIG. 5 is a block diagram illustrating the camera module and the deterioration compensator included in the foldable display device of FIG. 2.

FIG. 5 is a block diagram illustrating the camera module CM and the deterioration compensator 700 included in the foldable display device 10 of FIG. 2.

Referring to FIGS. 1 to 5, the deterioration compensator 700 may include a memory device 710, a compensation value calculator 720, and a compensation determiner 730.

The memory device 710 may receive the input image data IMG from the driving controller 200, and accumulate the input image data IMG over time to generate the stress value SV over time for each of the pixels P.

The compensation value calculator 720 may receive the input image data IMG from the driving controller 200 and receive the stress value SV from the memory device 710. The compensation value calculator 720 may generate the luminance compensation value LCV based on the input image data IMG and the stress value SV by using a lookup table LUT.

The compensation determiner 730 may receive the display luminance LUM_D from the camera module CM and receive the luminance compensation value LCV from the compensation value calculator 720. The compensation determiner 730 may determine whether to perform a deterioration compensating operation by comparing the display luminance LUM_D with the target luminance TL. When the display luminance LUM_D is greater than the target luminance TL, the compensation determiner 730 may not perform the deterioration compensating operation. In this case, the compensation determiner 730 may output the data signal DATA to the driving controller 200 without compensating for the display luminance LUM_D. A period in which the display luminance LUM_D is greater than the target luminance TL may be referred to as a mis-compensation period. The compensation determiner 730 may perform the deterioration compensating operation when the display luminance LUM_D is less than or equal to the target luminance TL. When the compensation determiner 730 performs the deterioration compensating operation, the compensation determiner 730 may compensate for the display luminance LUM_D by the luminance compensation value LCV, and output the data signal DATA to the driving controller 200. A period in which the display luminance LUM_D is less than or equal to the target luminance TL may be referred to as a compensation period.

Figure 6:
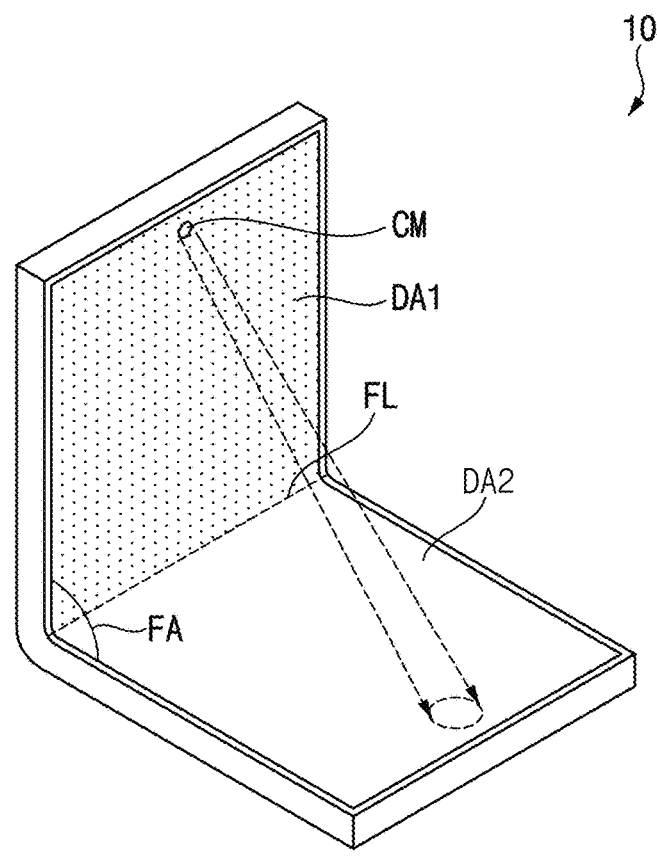
FIGS. 6 and 7 are schematic diagrams illustrating a deterioration compensating operation performed using the camera module included in the foldable display device of FIG. 2.
Figure 7:
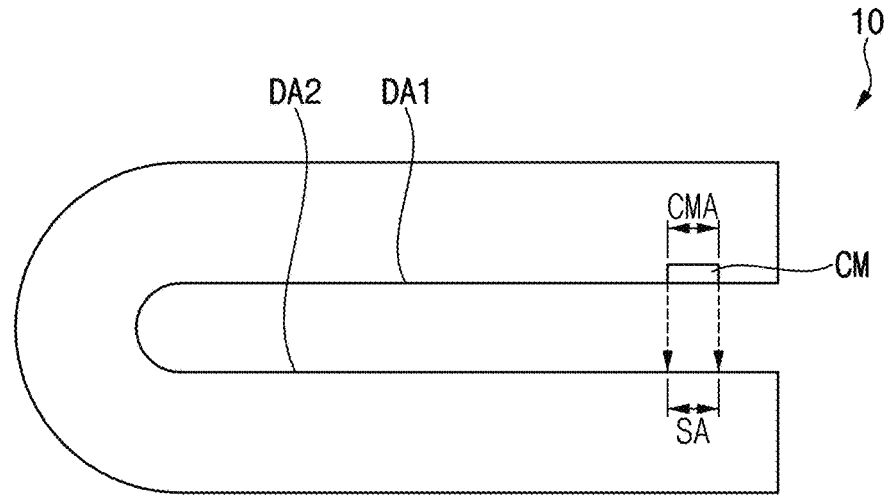

FIGS. 6 and 7 are schematic diagrams illustrating a deterioration compensating operation performed using the camera module CM included in the foldable display device 10 of FIG. 2.

Referring to FIGS. 1 to 7, as described above, unlike the above manufacturing process, it is difficult to request the user to measure the display luminance LUM_D by using the inspection apparatus after the flexible display device 10 is manufactured. However, the flexible display panel 100 may be folded about the folding line PL. Accordingly, when the folding angle FA is decreased to a predetermined angle or more, the camera module CM disposed in the first display area DA1 may capture an image of the display panel 100 in the second display area DA2. An area of the test image sensed by the camera module CM may be referred to as a sensing area. A sensing area SA, which is the area of the sensing area, may be determined by the folding angle FA, and the sensing area SA may be less than the area of the flexible display panel 100. Accordingly, since the display luminance LUM_D of the flexible display panel 100 cannot be sensed except for the sensing area, the luminance compensation value LCV of the sensing area SA may be equal to the luminance compensation value LCV of the entire flexible display panel 100. For example, the sensing area SA may be decreased as the folding angle FA is decreased, and the area of the image capturing area may be increased as the folding angle FA is increased. In particular, when the folding angle FA is less than or equal to a reference angle, the display panel 100 may display the test image in the second display region DA2, and the camera module CM may perform a sensing operation of sensing a luminance of the test image displayed in the second display area DA2. The reference angle may be an angle set to perform the sensing operation under the strict conditions such as during the above manufacturing process. In addition, the reference angle may be an angle indicating that the user is not using the foldable display device 10. As the folding angle FA is decreased, reliability of the sensing operation may be increased. In one embodiment, the reference angle may be 0 degrees. For example, when the reference angle is 0 degrees, the sensing area may be the same as the area CMA of the camera module CM.

As described above, since the sensing area SA is less than the area of the flexible display panel 100, the compensation value calculator 720 may perform the deterioration compensating operation for the entire flexible display panel 100 based on the sensing area SA.

Figure 8A:
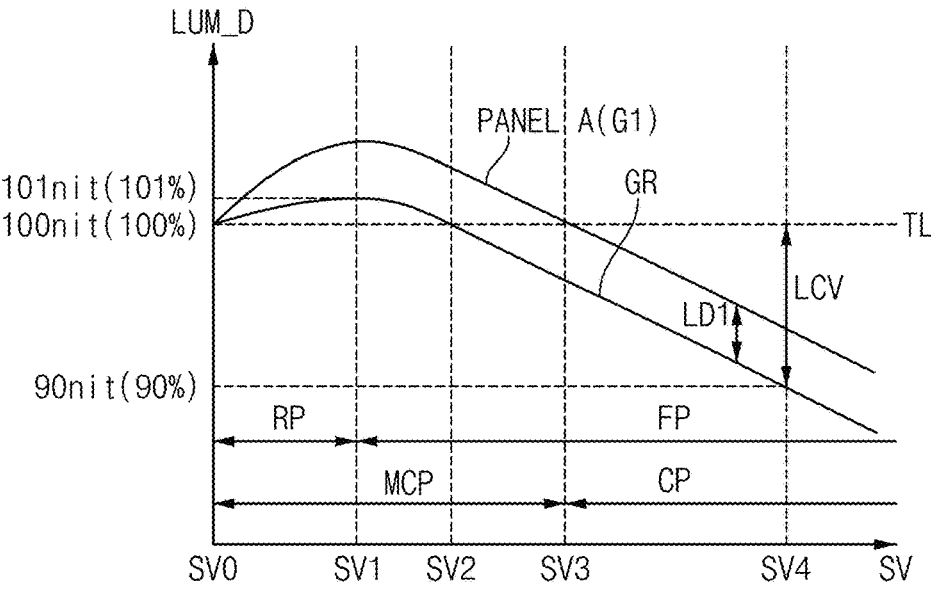
FIGS. 8A and 8B are graphs illustrating the deterioration compensating operation performed by the deterioration compensator of FIG. 3 with respect to the flexible display panel A of FIG. 5.
Figure 8B:
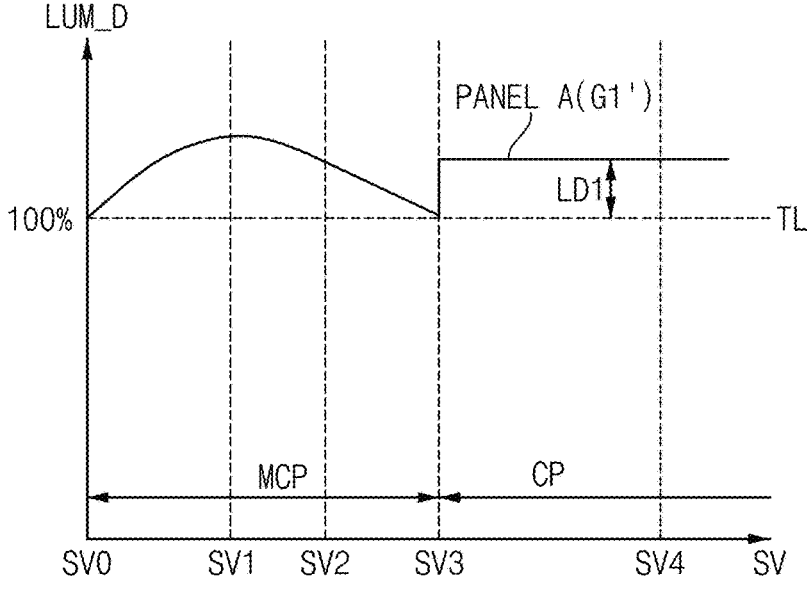

FIGS. 8A and 8B are graphs illustrating the deterioration compensating operation performed by the deterioration compensator 700 of FIG. 3 with respect to the flexible display panel A of FIG. 5.

Referring to FIGS. 1 to 8B, the deterioration compensator 700 may perform the deterioration compensating operation on the flexible display panel A.

The compensation value calculator 720 may calculate the luminance compensation value LCV based on the input image data IMG and the stress value SV by using the lookup table LUT. For example, the luminance compensation value LCV may be calculated as −1 nit at the first stress value SV1, the luminance compensation value LCV may be calculated as 0 nit at the third stress value SV3, and the luminance compensation value LCV may be calculated as 10 nit at the fourth stress value SV4.

The compensation determiner 730 may receive the display luminance LUM_D and the luminance compensation value LCV. The compensation determiner 730 may compare the display luminance LUM_D with the target luminance TL to determine that a period between the zero stress value SV0 and the third stress value SV3, which is a period in which the display luminance LUM_D is greater than the target luminance TL, is the mis-compensation period MCP, and may determine that a period after the third stress value SV3, which is a period in which the display luminance LUM_D is less than or equal to the target luminance TL, is the compensation period CP.

The compensation determiner 730 may not perform the deterioration compensating operation in the mis-compensation period MCP. Accordingly, as shown in FIG. 8B, the compensation determiner 730 may output the data signal DATA to the driving controller 200 without compensating for the display luminance LUM_D.

The compensation determiner 730 may perform the deterioration compensating operation during the compensation period CP. Accordingly, as shown in FIG. 8B, the compensation determiner 730 may compensate for the display luminance LUM_D by the luminance compensation value LCV to output the data signal DATA to the driving controller 200.

As described above, the deterioration compensator 700 may perform the deterioration compensating operation like a deterioration curve G1' of the flexible display panel A of FIG. 8B.

Figure 9A:
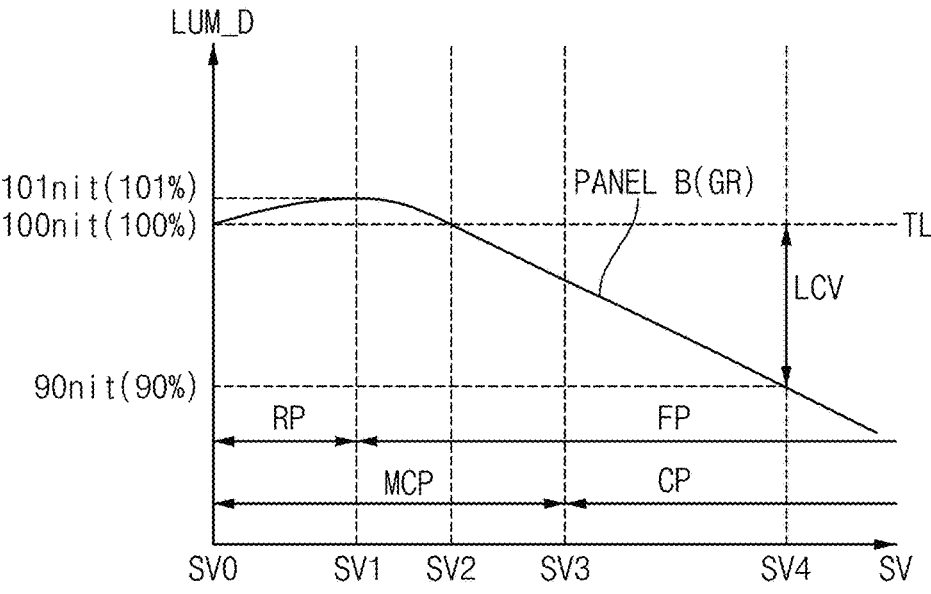
FIGS. 9A and 9B are graphs illustrating the deterioration compensating operation performed by the deterioration compensator of FIG. 3 with respect to the flexible display panel B of FIG. 5.
Figure 9B:
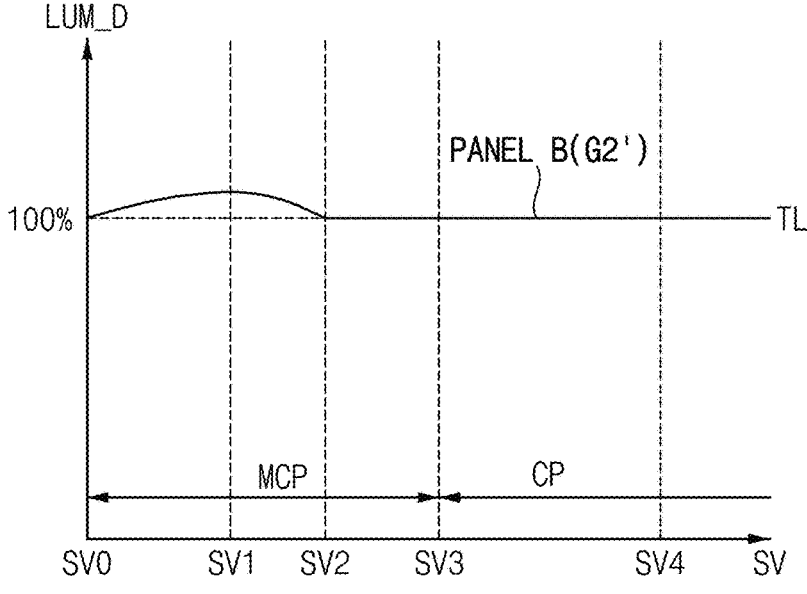

FIGS. 9A and 9B are graphs illustrating the deterioration compensating operation performed by the deterioration compensator 700 of FIG. 3 with respect to the flexible display panel B of FIG. 5.

Referring to FIGS. 1 to 9B, the deterioration compensator 700 may perform the deterioration compensating operation with respect to the flexible display panel B.

The compensation value calculator 720 may calculate the luminance compensation value LCV based on the input image data IMG and the stress value SV by using the lookup table LUT. For example, the luminance compensation value LCV may be calculated as −1 nit at the first stress value SV1, the luminance compensation value LCV may be calculated as 0 nit at the third stress value SV3, and the luminance compensation value LCV may be calculated as 10 nit at the fourth stress value SV4.

The compensation determiner 730 may receive the display luminance LUM_D and the luminance compensation value LCV. The compensation determiner 730 may compare the display luminance LUM_D with the target luminance TL to determine that a period between the zero stress value SV0 and the second stress value SV2, which is a period in which the display luminance LUM_D is greater than the target luminance TL, is the mis-compensation period MCP, and may determine that a period after the second stress value SV2, which is a period in which the display luminance LUM_D is less than or equal to the target luminance TL, is the compensation period CP.

The compensation determiner 730 may not perform the deterioration compensating operation during the mis-compensation period MCP. Accordingly, as shown in FIG. 9B, the compensation determiner 730 may output the data signal DATA to the driving controller 200 without compensating for the display luminance LUM_D.

The compensation determiner 730 may perform the deterioration compensating operation during the compensation period CP. Accordingly, as shown in FIG. 9, the compensation determiner 730 may compensate for the display luminance LUM_D by the luminance compensation value LCV to output the data signal DATA to the driving controller 200.

As described above, the deterioration compensator 700 may perform the deterioration compensating operation like a deterioration curve G2' of the flexible display panel B of FIG. 9B.

Figure 10A:
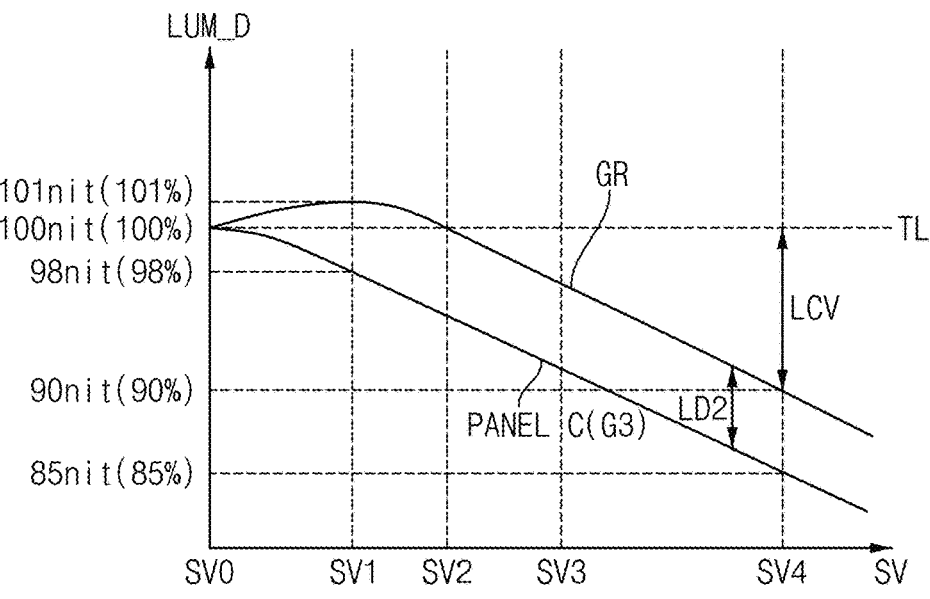
FIGS. 10A and 10B are graphs illustrating the deterioration compensating operation performed by the deterioration compensator of FIG. 3 with respect to the flexible display panel C of FIG. 5.
Figure 10B:
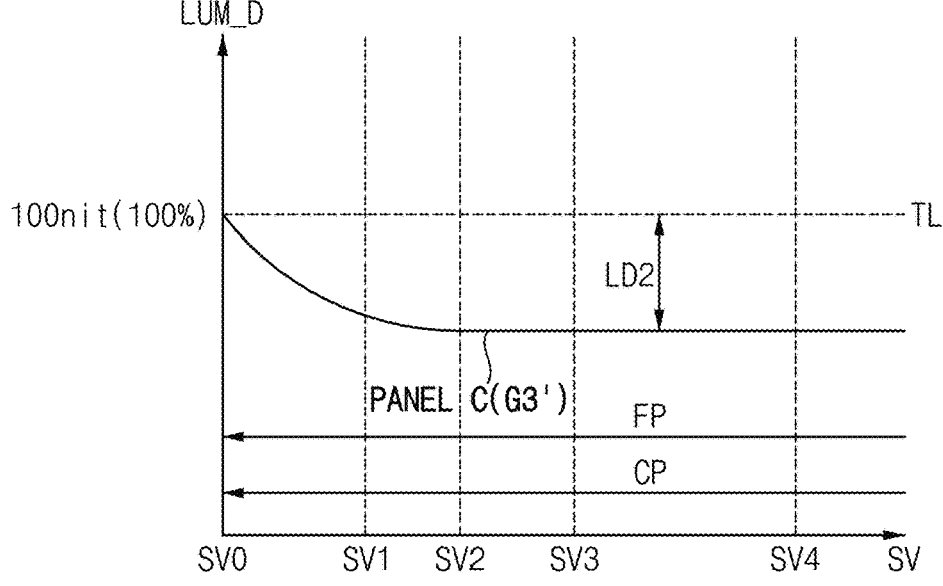

FIGS. 10A and 10B are graphs illustrating the deterioration compensating operation performed by the deterioration compensator 700 of FIG. 3 with respect to the flexible display panel C of FIG. 5.

Referring to FIGS. 1 to 10B, the deterioration compensator 700 may perform the deterioration compensating operation with respect to the flexible display panel C.

The compensation value calculator 720 may calculate the luminance compensation value LCV based on the input image data IMG and the stress value SV by using the lookup table LUT. For example, the luminance compensation value LCV may be calculated as −1 nit at the first stress value SV1, the luminance compensation value LCV may be calculated as 0 nit at the third stress value SV3, and the luminance compensation value LCV may be calculated as 10 nit at the fourth stress value SV4.

The compensation determiner 730 may receive the display luminance LUM_D and the luminance compensation value LCV. The compensation determiner 730 may compare the display luminance LUM_D with the target luminance TL to determine that the period after the zero stress value SV0, which is a period in which the display luminance LUM_D is less than or equal to the target luminance TL, is the compensation period CP.

The compensation determiner 730 may perform the deterioration compensating operation during the compensation period CP. Accordingly, as shown in FIG. 10B, the compensation determiner 730 may compensate for the display luminance LUM_D by the luminance compensation value LCV to output the data signal DATA to the driving controller 200.

As described above, the foldable display device 10 may use the camera module CM disposed in the first display area DA1 of the flexible display panel 100 to sense the display luminance LUM_D as the luminance of the test image, may not perform the deterioration compensating operation in the mis-compensation period MCP, which is a section in which the display luminance LUM_D is greater than the target luminance TL, and may perform the deterioration compensating operation in the compensation period CP which is a section in which the display luminance LUM_D is less than or equal to the target luminance TL. Accordingly, the foldable display device 10 may selectively perform the deterioration compensating operation in the compensation period CP to improve display quality of the foldable display device 10.

As described above, the deterioration compensator 700 may perform the deterioration compensating operation like a deterioration curve G3' of the flexible display panel C of FIG. 10B.

FIG. 11 is a flowchart illustrating a method for compensating for deterioration of the flexible display panel 100 according to one embodiment of the present disclosure.

Referring to FIGS. 1 to 11, the method for compensating for deterioration of the flexible display panel 100 according to one embodiment of the present disclosure includes the steps of: sensing a display luminance LUM_D, which is a luminance of a test image displayed on the flexible display panel 100 including a folding line PL, a first display area DA1 disposed on a first side of the folding line PL, and a second display area DA2 disposed on a second side of the folding line PL (S100); and performing a deterioration compensating operation of compensating for the display luminance LUM_D by a luminance compensation value LCV when the display luminance LUM_D is less than or equal to a target luminance TL without performing the deterioration compensating operation when the display luminance LUM_D is greater than the target luminance TL (S200).

The method for compensating for the deterioration of the flexible display panel 100 of FIG. 11 is substantially the same as the method for compensating for the deterioration of the foldable display device 10 of FIG. 2. Therefore, substantially the same description will be omitted.

Figure 13:
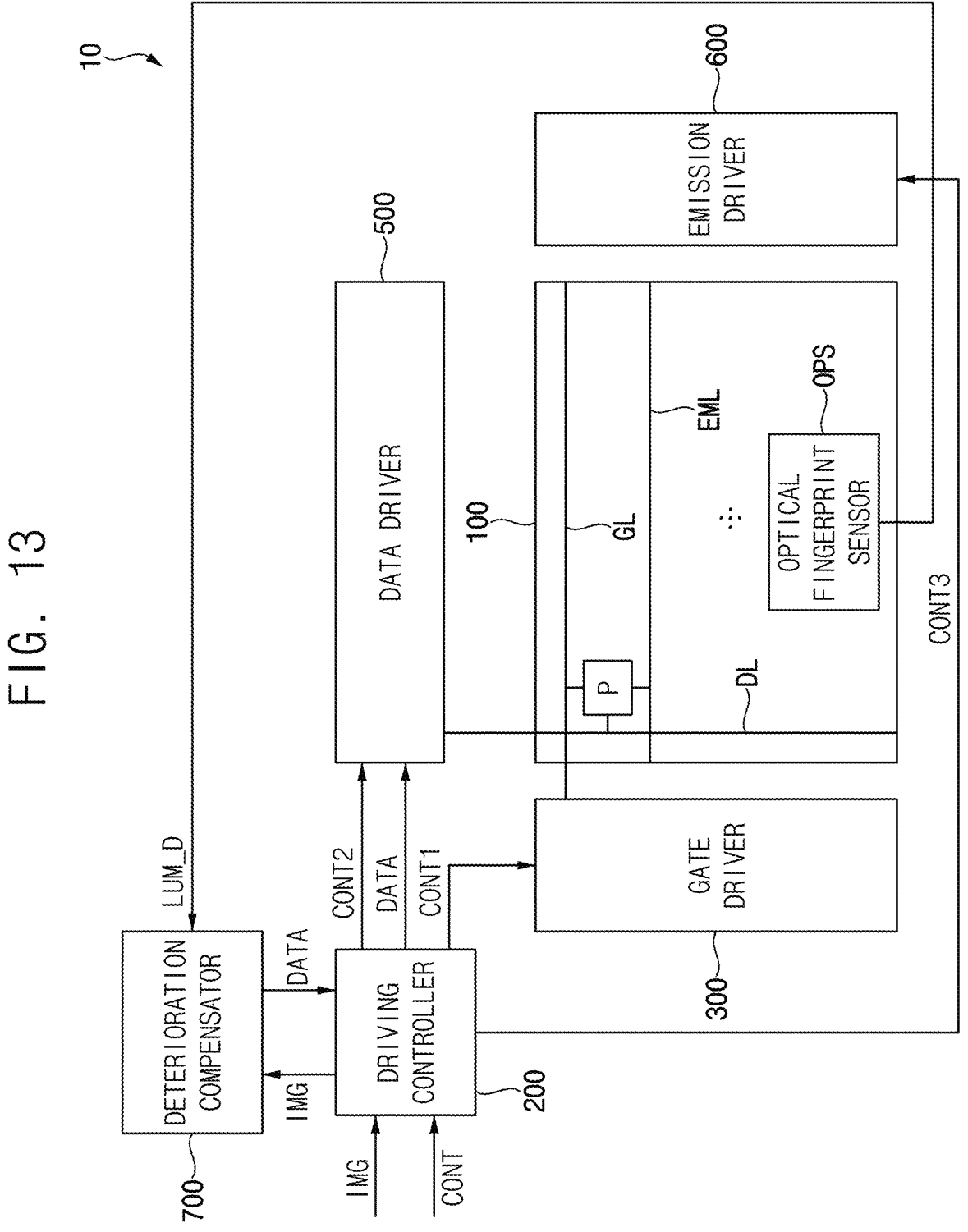
FIG. 13 is a block diagram illustrating the foldable display device of FIG. 12.

Thus, according to the method for compensating for the deterioration of the flexible display panel 100, the display luminance LUM_D as the luminance of the test image may be sensed using the optical module disposed in the first display area DA1 of the flexible display panel 100, the deterioration compensating operation may not be performed in a mis-compensation period MCP), which is a period in which the display luminance LUM_D is greater than the target luminance TL, and the deterioration compensating operation may be performed in a compensation period CP, which is a period in which the display luminance LUM_D is less than or equal to the target luminance TL. Accordingly, the method for compensating for the deterioration of the flexible display panel 100 may selectively perform the deterioration compensating operation in the compensation period CP, so that the display quality of the foldable display device 10 can be improved FIG. 12 is a perspective view illustrating a foldable display device 10 according to embodiments. FIG. 13 is a block diagram illustrating the foldable display device 10 of FIG. 12.

Referring to FIGS. 12 and 13, the foldable display device 10 may includes a flexible display panel 100 and a display panel driver. The display panel driver may include a driving controller 200, a gate driver 300, a data driver 500, an emission driver 600, and a deterioration compensator 700. The foldable display device 10 may further include an optical module. In an embodiment, the optical module may be an optical fingerprint sensor OFS.

The optical fingerprint sensor OFS may be disposed in a second display area DA2. Generally, the optical fingerprint sensor OFS may sense a user's a fingerprint by receiving a light reflected from the user's a finger. The optical fingerprint sensor OFS may also be used as an illumination sensor. In this case, the optical fingerprint sensor OFS may sense external luminance. In present invention, the flexible display panel 100 may display a test image in a first display area DA1, and the optical fingerprint sensor OFS may sense a display luminance LUM_D, which is a luminance of the test image.

The foldable display device of FIGS. 12 and 13 is substantially the same as the foldable display device of FIGS. 1 and 2 except that the optical module is the optical fingerprint sensor OFS. That is, only a method of sensing the external luminance is different, and an operation of the deterioration compensator 700 described in FIGS. 4A to 11 is substantially the same. Therefore, redundant explanation regarding this will be omitted.

Figure 14:
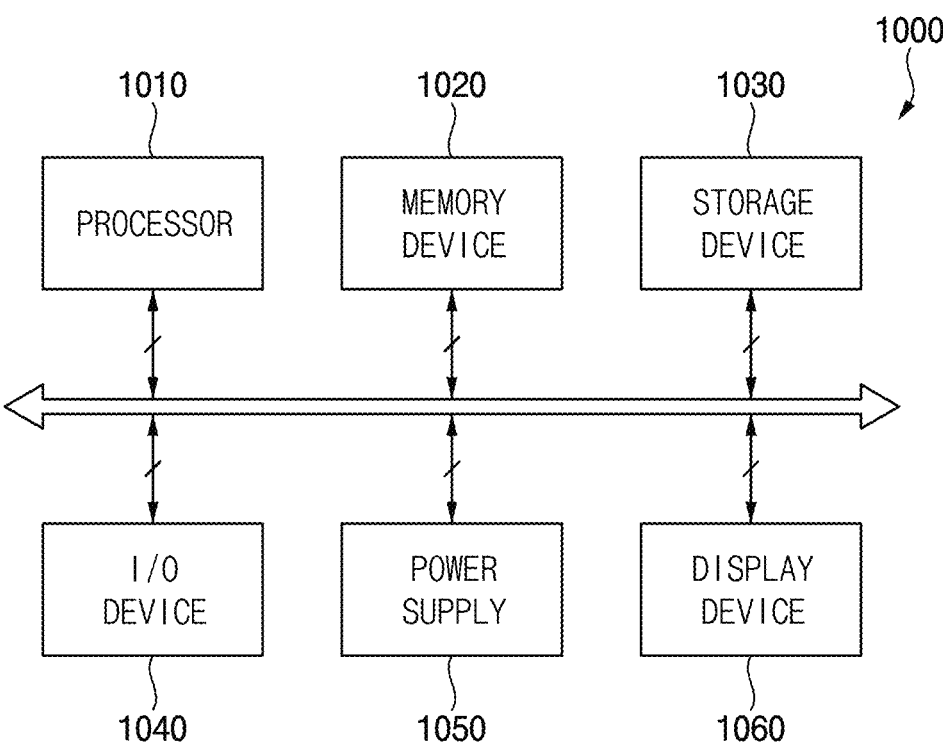
FIG. 14 is a block diagram illustrating an electronic device.

FIG. 14 is a block diagram illustrating an electronic device 1000.

Referring to FIG. 14, the electronic device 1000 may include a processor 1010, a memory device 1020, a storage device 1030, an input/output (I/O) device 1040, a power supply 1050, and a display device 1060. The display device 1060 may be the foldable display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures.

Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A foldable display device comprising: a flexible display panel including a folding line, a first display area disposed on a first side of the folding line, and a second display area disposed on a second side of the folding line to display a test image;

an optical module disposed in the first display area and configured to sense a display luminance of the test image when a folding angle between the first display area and the second display area is less than or equal to a reference angle;

a deterioration compensator configured to compare the display luminance with a target luminance, and perform a deterioration compensating operation of the display luminance by a luminance compensation value during a period in which the the display luminance is less than the target luminance, without performing the deterioration compensating operation during a period in which the display luminance is greater than the target luminance, wherein the deterioration compensating operation is performed by using a lookup table including the luminance compensation value corresponding to a stress value of the flexible display panel, wherein the target luminance is the display luminance when the stress value is zero; and wherein the deterioration compensator includes: a memory device configured to store the stress value of the flexible display panel; a compensation value calculator configured to calculate the luminance compensation value based on the stress value; and a compensation determiner configured to determine whether to perform the deterioration compensating operation by comparing the display luminance with the target luminance, and compensate for the display luminance by the luminance compensation value when the deterioration compensating operation is performed, wherein the deterioration compensating operation is to compensate for a deterioration of the flexible display panel due to a use of the flexible display panel.

2. The foldable display device of claim 1, wherein the reference angle includes 0 degrees.

3. The foldable display device of claim 1, wherein a sensing area of the test image sensed by the optical module is determined by the folding angle.

4. The foldable display device of claim 3, wherein the sensing area is less than an area of the flexible display panel.

5. The foldable display device of claim 4, wherein the sensing area is equal to an area of the optical module when the folding angle is 0 degrees.

6. The foldable display device of claim 4, wherein the deterioration compensating operation is performed on a whole of the flexible display panel based on the sensing area.

7. The foldable display device of claim 6, wherein the luminance compensation value is applied to the whole of the flexible display panel.

8. The foldable display device of claim 1, wherein the test image is displayed in the second display area when the sensing operation is performed.

9. The foldable display device of claim 1, wherein the deterioration compensator includes the lookup table including the luminance compensation value corresponding to the stress value of the flexible display panel, and wherein the stress value is a degree of deterioration of a pixel that depends on one or more operating conditions of the pixel over time.

10. The foldable display device of claim 9, wherein the deterioration compensator uses the lookup table to compensate for the display luminance by the luminance compensation value.

11. The foldable display device of claim 1, wherein the optical module includes a camera module or an optical fingerprint sensor.

12. A method of compensating for deterioration of a flexible display panel, the method comprising:

sensing a display luminance of a test image displayed on a flexible display panel that includes a folding line, a first display area disposed on a first side of the folding line, and a second display area disposed on a second side of the folding line to display the test image; and wherein the sensing the display luminance includes an optical module performing a sensing operation when a folding angle between the first display area and the second display area is less than or equal to a reference angle, performing, by a deterioration compensator, a deterioration compensating operation of comparing the display luminance with a target luminance, and compensating for the display luminance by a luminance compensation value during a period in which the display luminance is less than the target luminance and not performing the deterioration compensating operation during a period in which the display luminance is greater than the target luminance, wherein the deterioration compensating operation is performed by using a lookup table including the luminance compensation value corresponding to a stress value of the flexible display panel, wherein the target luminance is the display luminance when the stress value is zero, and wherein the deterioration compensator includes: a memory device configured to store the stress value of the flexible display panel; a compensation value calculator configured to calculate the luminance compensation value based on the stress value; and a compensation determiner configured to determine whether to perform the deterioration compensating operation by comparing the display luminance with the target luminance, and compensate for the display luminance by the luminance compensation value when the deterioration compensating operation is performed, wherein the deterioration compensating operation is to compensate for a deterioration of the flexible display panel due to a use of the flexible display panel.

13. The method of claim 12, wherein the reference angle includes 0 degrees.

14. A method of compensating for deterioration of a flexible display panel, the method comprising:

sensing a display luminance of a test image displayed on a flexible display panel that includes a folding line, a first display area disposed on a first side of the folding line, and a second display area disposed on a second side of the folding line to display the test image; and performing a deterioration compensating operation of compensating for the display luminance by a luminance compensation value when the display luminance is less than a target luminance and not performing the deterioration compensating operation when the display luminance is greater than the target luminance, wherein the deterioration compensating operation is performed by using a lookup table including the luminance compensation value corresponding to a stress value of the flexible display panel, wherein the target luminance is the display luminance when the stress value is zero, and wherein the deterioration compensating operation is to compensate for a deterioration of the flexible display panel due to a use of the flexible display panel.

15. The method of claim 14, wherein the sensing area is less than an area of the flexible display panel.

16. The method of claim 15, wherein the sensing area is equal to an area of the optical module when the folding angle is 0 degrees.

17. The method of claim 15, wherein the performing the deterioration compensating operation is performed on a whole of the flexible display panel based on the sensing area.

* * * * *